G. M. WILLIS.
TRANSMISSION MECHANISM.
APPLICATION FILED FEB. 7, 1914.
1,268,777.
Patented June 4, 1918.
6 SHEETS—SHEET 2.
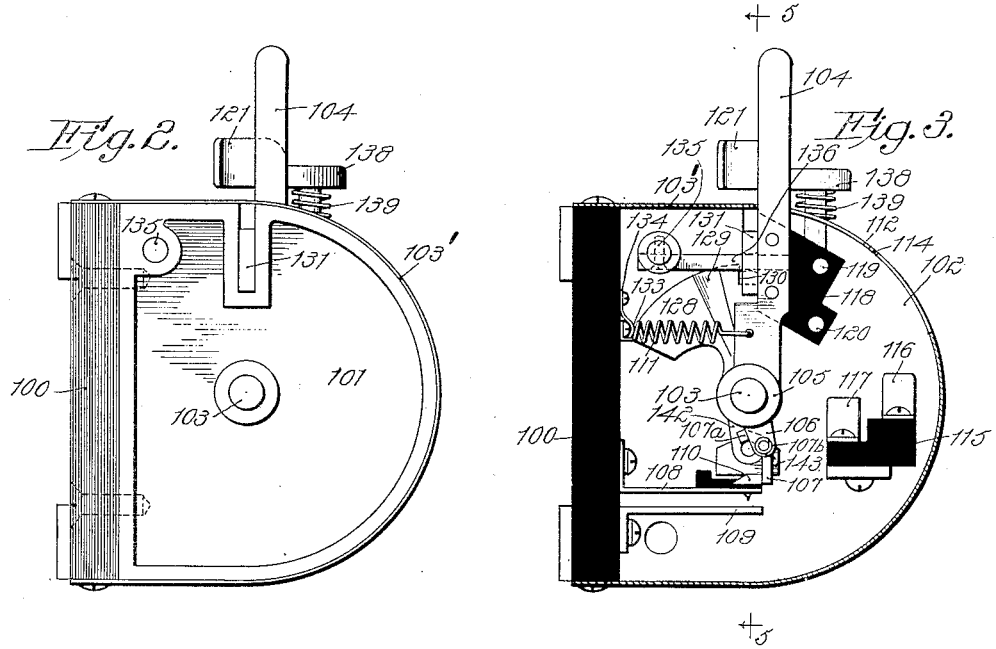
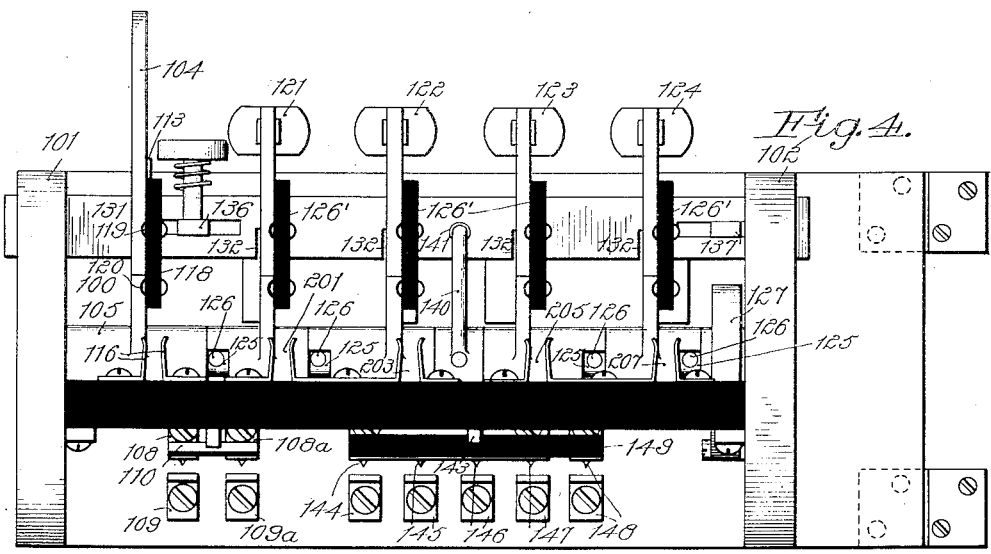
Witnesses:
Robert F. Bracke
Leonard E. Bogue
Inventor
George M. Willis
By Brown Williams Bell Hanson & Boettcher
Attorneys

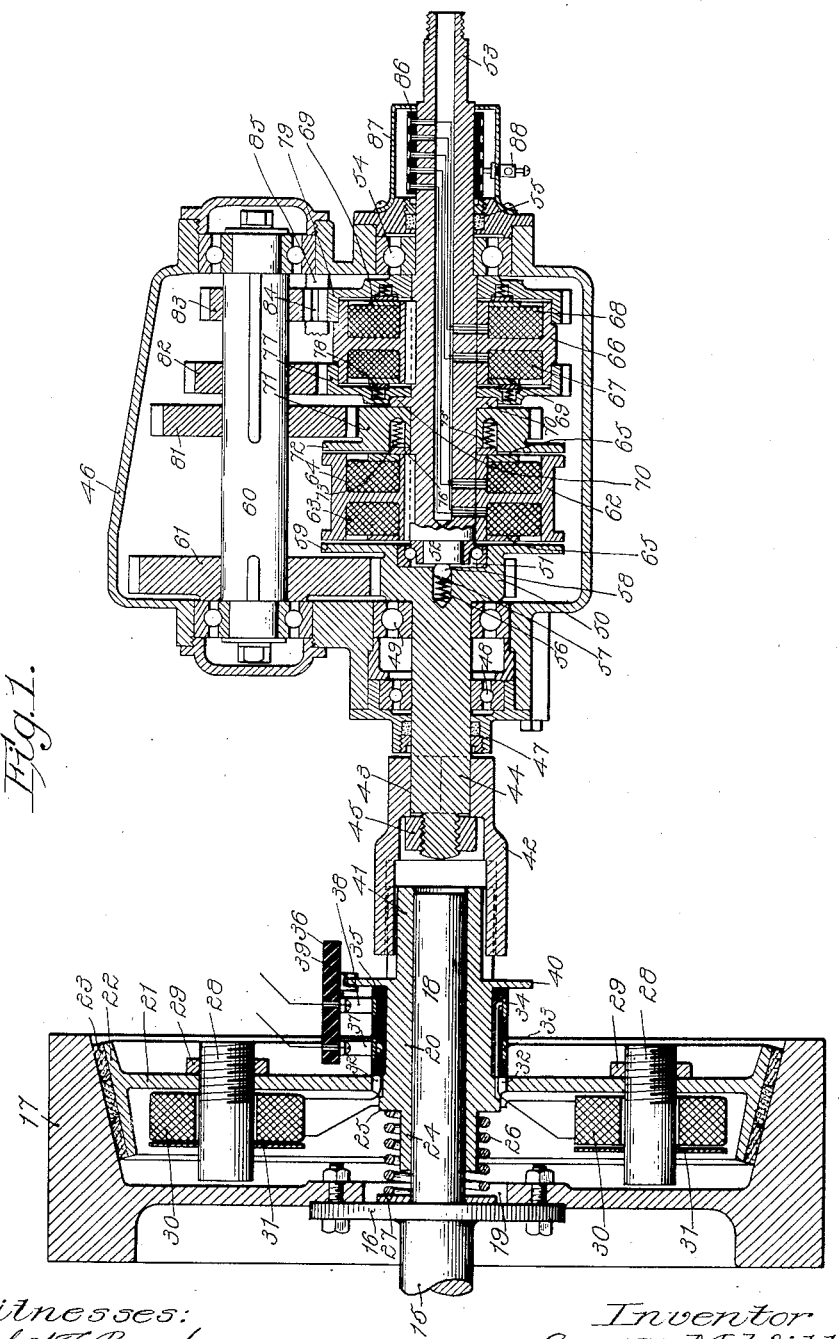

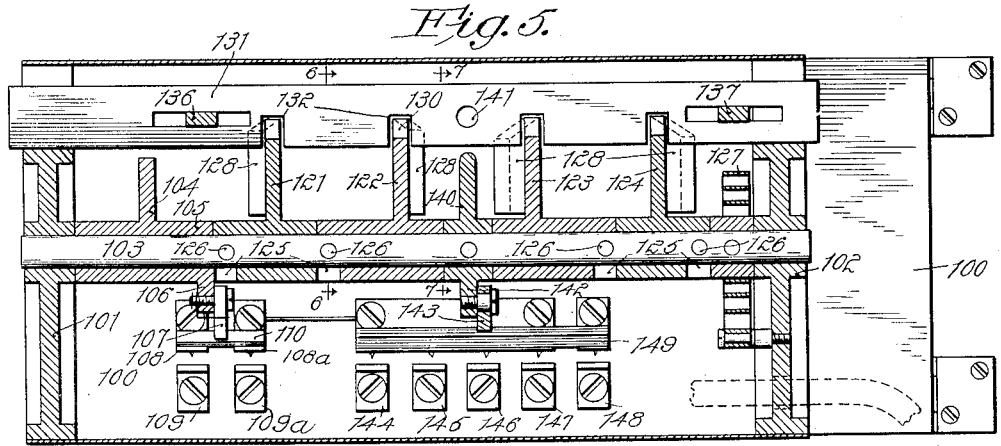
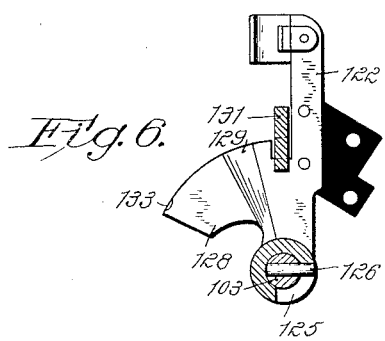
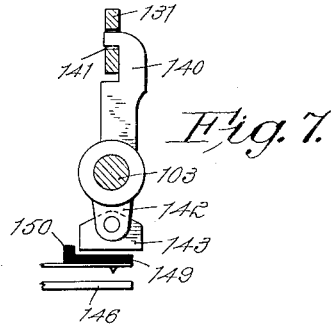
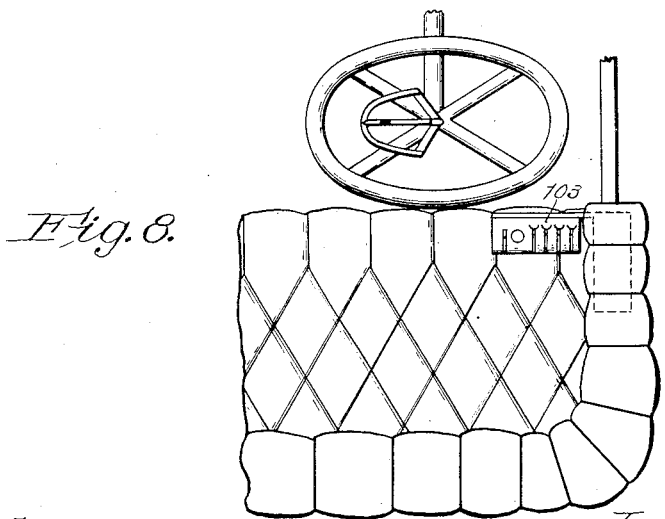

G. M. WILLIS.
TRANSMISSION MECHANISM.
APPLICATION FILED FEB. 7, 1914.

1,268,777.

Patented June 4, 1918.
6 SHEETS—SHEET 4.

Witnesses:
Robert F. Brackl
Leonard E. Bogue

Inventor
George M. Willis
By Brown Williams Bell Hanson & Boettcher
Attorneys

G. M. WILLIS.
TRANSMISSION MECHANISM.
APPLICATION FILED FEB. 7, 1914.
1,268,777.
Patented June 4, 1918.
6 SHEETS—SHEET 5.
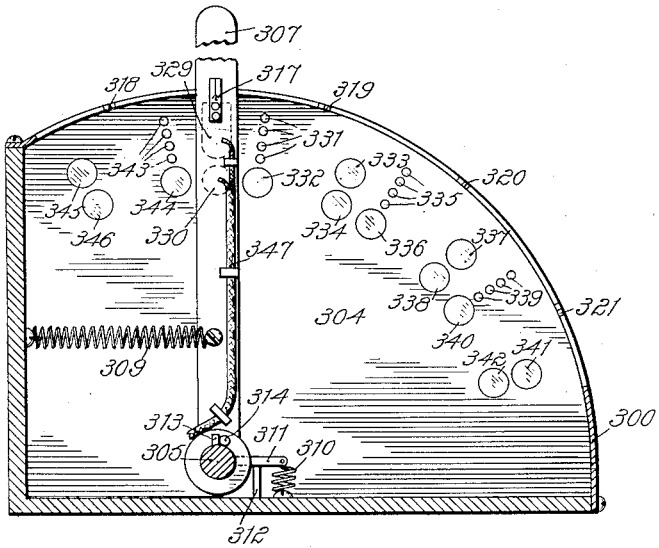
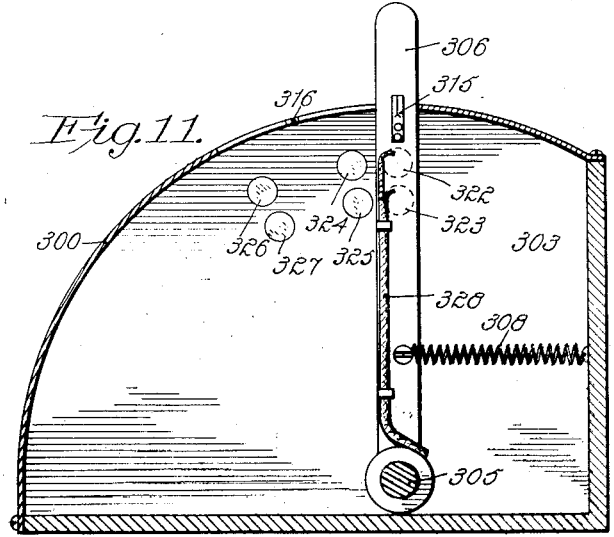
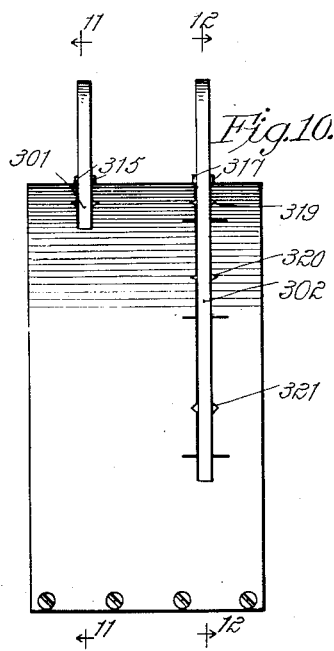
Witnesses:
Robert F. Bracke
Leonard E. Bogue
Inventor
George M. Willis
By Brown Williams Bell Hanson & Boettcher
Attorneys.

G. M. WILLIS.
TRANSMISSION MECHANISM.
APPLICATION FILED FEB. 7, 1914.

1,268,777.

Patented June 4, 1918.
6 SHEETS—SHEET 6.

Witnesses:
Robert F. Brack
Leonard E. Bogue

Inventor
George M. Willis
By Brown Williams Bell Hanson & Brettcher
Attorneys

UNITED STATES PATENT OFFICE.

GEORGE M. WILLIS, OF CHICAGO, ILLINOIS, ASSIGNOR, BY DIRECT AND MESNE ASSIGN-
MENTS, TO CHARLES A. BROWN, HARVEY L. HANSON, AND ARTHUR H. BOETTCHER,
DOING BUSINESS UNDER THE FIRM-NAME OF BROWN, HANSON & BOETTCHER.

TRANSMISSION MECHANISM.

1,268,777.        Specification of Letters Patent.      Patented June 4, 1918.

Application filed February 7, 1914. Serial No. 817,133.

*To all whom it may concern:*

Be it known that I, GEORGE M. WILLIS, a citizen of the United States, residing at Chicago, in the county of Cook and State of Illinois, have invented certain new and useful Improvements in Transmission Mechanism, of which the following is a full, clear, concise, and exact description, reference being had to the accompanying drawings, forming a part of this specification.

My invention relates to transmission mechanism, particularly transmission mechanism for use in self-propelled vehicles, and its object is to provide an improved mechanism of this class.

I contemplate the provision of variable speed transmission gearing and devices for electrically effecting the engagement of the necessary gears to secure any desired speed. I also provide means whereby the gearing may be electrically rendered inoperative.

My invention will be more clearly understood by referring to the following description in which reference is made to the accompanying drawings in which Figure 1 is a view partly in section, and partly in elevation, illustrating the transmission mechanism of my invention.

Fig. 2 is an end elevational view of the switching or controlling mechanism.

Fig. 3 is a similar view with the end plate removed to more clearly reveal the inner construction of the switching or controlling mechanism.

Fig. 4 is a front elevational view of the switching or controlling mechanism with the front plate removed.

Fig. 5 is a sectional view of the controlling mechanism taken on the line 5—5 of Fig. 3, looking in the direction indicated by the arrows.

Fig. 6 is a detail view of one of the selector levers of the switching or controlling mechanism, taken on the line 6—6 of Fig. 5.

Fig. 7 is a detail view of the means provided for retaining the locking bar of the switching or controlling mechanism in normal position.

Fig. 8 is a fragmentary plan view illustrating how the switching or controlling mechanism is mounted upon an automobile.

Fig. 10 is a front elevational view of a modified form of switching or controlling mechanism which may be employed if desired.

Fig. 11 is a cross-sectional view thereof, taken on the line 11—11 of Fig. 10 and looking in the direction indicated by the arrows.

Fig. 12 is a cross-sectional view taken on the line 12—12 of Fig. 10, looking in the direction indicated by the arrows.

Figure 13:
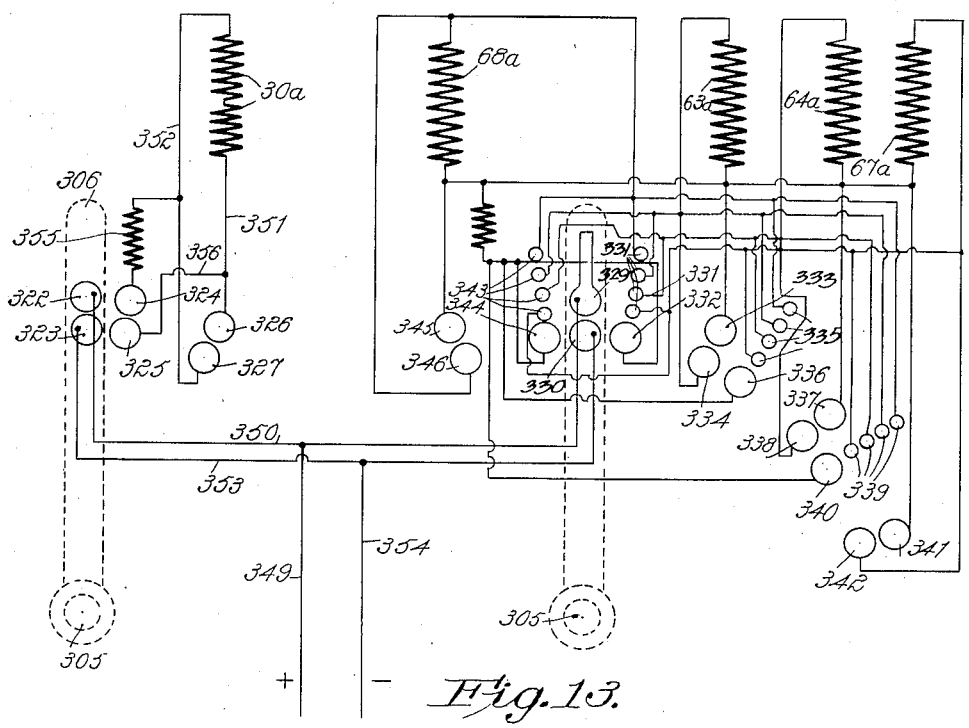

Fig. 13 diagrammatically illustrates the circuit connections employed when the switching or controlling mechanism illustrated in Figs. 10 to 12, both inclusive, is utilized in conjunction with the transmission mechanism shown in Fig. 1.

Figure 14:
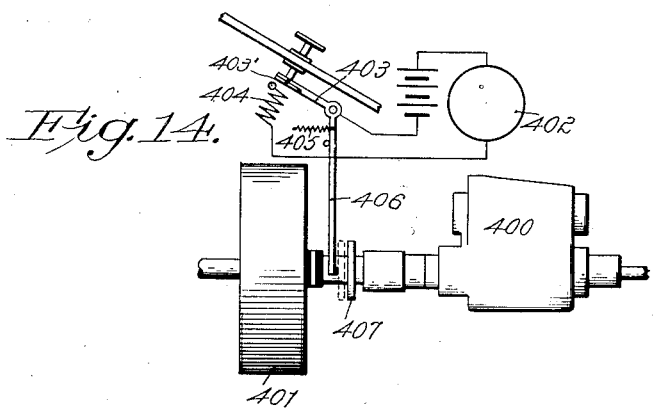

Fig. 14 illustrates a system of the type shown in Fig. 1 in which a starting motor is employed to start the internal combustion engine with which the transmission mechanism is associated, devices being provided for automatically preventing the operation of the starting motor until the cone clutch interposed in the transmission mechanism is in released condition.

Similar reference numerals refer to similar parts throughout the several views.

Referring now to Fig. 1, I have illustrated at 15 a shaft which may either be the shaft of an internal combustion engine, or may be operatively connected with any suitable power plant whatsoever. The shaft 15 is provided with an integral flange 16 and bolted to said flange is a fly-wheel 17 which also serves as the female element of a cone clutch. The shaft 15 preferably comprises a portion 18 of smaller diameter projecting through an opening 19 in the center of the fly-wheel 17.

Arranged to fit within the fly-wheel 17 is a male cone clutch element comprising a hub or sleeve 20 disposed upon the portion 18 of the shaft 15, a web 21 formed integral with the hub 20, and a substantially frustoconical peripheral portion 22 formed integral with the web 21. The periphery of the male element of the cone clutch just referred to is provided with suitable material such as cork, leather or fiber, indicated at 23, in order to secure effective frictional engagement between the two elements of the cone clutch. The sleeve or bushing 20, which forms the hub for the male element of the cone clutch and is rotatably mounted on the portion 18 of the shaft 15, is provided with a reduced portion 24, thus forming a shoulder 25 against which bears one end of a compression spring 26, the other end of said compression spring bearing against a washer 27, abutting against the integral flange 16 of the shaft 15. Ball bearings may be interposed between the washer 27 and the flange 16 if desired, but I have not thought it necessary to disclose these ball bearings as this construction is well known to those skilled in the art.

Threaded into the web 21 of the male element of the cone clutch is a plurality of iron bars 28, of circular cross section, which bars serve as the cores for certain electromagnet windings to be hereinafter referred to. The bars or cores 28, are locked at any positions desired by means of the lock nuts 29. Attention is called to the fact that the left ends of the bars or cores 28 are located in proximity to the web of the fly-wheel 17. Both elements of the cone clutch and the cores 28 are, of course, constructed of magnetic material.

Disposed upon each one of the bars or cores 28, is an electromagnet winding 30, a protecting plate 31 being provided for each one of said windings. As will more fully appear when I proceed with the description of the circuits, the electromagnet windings 30 are connected in series with each other, lead wires passing through apertures 32 in the web 21 of the male element of the cone clutch serving to electrically connect the electromagnet windings with a pair of commutator rings 33 and 34 mounted in a sleeve of insulating material 35, fixed upon the hub 20 of the male element of the cone clutch.

At 36 I have illustrated a block of insulating material provided with brushes 37 and 38, arranged to ride upon the commutator rings 33 and 34 respectively. The block 36 is slidably mounted upon some portion (not shown) of the vehicle and is provided with a clip 39 arranged to engage the integral flange 40 of the hub 20.

From the above description it will be seen that the compression spring 26 normally holds the male and female elements of the cone clutch out of operative relation, but that when the electromagnet windings 30 are energized the male element of the cone clutch is magnetically drawn into engagement with the fly wheel 17, thus compressing the spring 26. The spring 26 is comparatively weak and the elements of the cone clutch have such magnetic properties that after an electric current has been caused to flow through the electromagnet windings 30, the residual magnetism of the parts will serve to hold the male and female elements of the cone clutch in operative relation until a current flowing through the electromagnet windings in a direction opposite to the flow of the current which first energized the electromagnet windings is caused to neutralize the residual magnetism referred to.

As this description progresses it will be seen that when I desire to disengage the clutch elements I pass a small amount of current through the electromagnet windings 30 to neutralize the residual magnetism of the cone clutch elements. It will be understood that considerable magnetic attraction is necessary to effect the initial engagement of the cone clutch elements. While the energizing current is flowing through the electromagnet windings 30, a sufficient magnetic field is produced to effect the engagement of the cone clutch elements. After this engagement has been effected, the energizing current may be cut off and the residual magnetism is sufficient to hold the elements of the cone clutch in operative relation until the deënergizing current is caused to flow through the electromagnet windings. Of course it is to be understood that in practice it is never desirable to keep the elements of a clutch of this kind in operative relation at one time for more than a few hours at the most. The residual magnetism which remains after the energizing current has been cut off is, therefore, sufficient to keep the elements of the cone clutch in operative relation for as long a period of time as it is ever necessary in practice.

The hub 20 of the male element of the cone clutch is provided at its right hand end with a portion 41 of reduced cross section, which portion 41 fits within a sleeve 42. The sleeve 42 is non-rotatable with respect to the male element of the cone clutch but may be shifted longitudinally of its axis independently thereof. This relation may be obtained by splining the sleeve 42 upon the portion 41 of the hub 20, or by giving the portion 41 a polygonal cross section, and providing the sleeve 41 with a corresponding opening within which the portion 41 is fitted.

The sleeve 42 is provided at its right end with a square opening 43 into which extends the squared end of a shaft 44, the shaft 44 being retained in the sleeve 42 by means of a nut 45. The shaft 44 extends into a suitable gear case 46 and is adapted to be operatively connected with suitable gearing within said gear case. The said shaft 44 extends into the gear case 46 through a stuffing box 47, and is provided with suitable ball bearings 48 and 49 as shown.

Formed integral with the right hand end of the shaft 44 is a gear 50. The shaft 44 is hollowed out at 51 to receive a suitable thrust bearing in which is mounted the reduced end 52 of a shaft 53 also mounted in ball bearings 54 and passing out of the gear case 46 through a stuffing box 55. The shaft 44 is also hollowed out at 56 to receive a compression spring 57 which tends to throw a ball 58 against the adjacent end of the shaft 53. Formed integral with the gear 50, which is also formed integral with the shaft 44, is an annular flange 59 which, as will be presently explained, at certain times acts as a clutch member.

Supported in suitable ball bearings carried by the gear case 46 and disposed substantially parallel to the shaft 53, is a shaft 60 to which is keyed a gear 61 meshing with the gear 50 formed integral with the shaft 44. Attention is directed to the fact that the ratio of the gear 61 to the gear 50 is substantially two to one. Disposed upon the shaft 53 and splined thereon, is a spool 62 of magnetic material, which, as will be presently made apparent, serves as a core for certain electromagnet windings. The spool 62 being splined upon the shaft 53 is non-rotatable relatively to the shaft but may be shifted slightly longitudinally of the shaft. Carried by the spool 62 are the electromagnet windings 63 and 64, the purpose of which will be presently explained. Each of the windings 63 and 64 is held in position and protected by means of a washer 65 fitted upon the hub of the spool 62.

Also splined upon the shaft 53 is a spool 66 generally similar to the spool 62, the only differences between said spools being in their peripheries, the spool 66 being so conformed that certain hollow gears may embrace it as will be subsequently explained. The spool 66 is provided with electromagnet windings 67 and 68 in all respects similar to the windings 63 and 64 of the spool 62, the windings 67 and 68 being held in place and protected by washers 69 similar to the washers 65 of the spool 62. The spools 62 and 66 serve as clutch members in a manner to be shortly made apparent. Attention is directed to the fact that there is normally a slight clearance between the flange 59 and the left hand side of the spool 62, the compression spring 57 tending to hold the spool out of engagement with the said flange 59.

As is clearly illustrated at 70, the shaft 53 is provided with an annular flange against which bears a gear 71 loosely mounted upon the shaft 53. The gear 71 which is made of magnetic material, is provided with an integral flange 72 disposed adjacent the right hand side of the spool 62. The gear 71 is also provided with a plurality of depressions or holes 73, in which are disposed like compression springs 75 which tend to move a washer 76 toward the spool 62 and to retain the flange 72 out of frictional engagement with the spool 62. Disposed adjacent the flange 70 of the shaft 53 and loosely mounted upon the shaft 53, is a gear 77 hollowed out in order that it may overlap the left side of the spool 66 as shown. There is in practice a very slight clearance between the periphery of the spool 66 and that portion of the gear 77 which overlaps it. The gear 77 is provided with openings 78 in which are disposed compression springs which tend to retain the left hand side of the spool 66 out of frictional engagement with the gear 77. The gear 77 is constructed of magnetic material.

Loosely disposed upon the shaft 53 and located on the right side of the spool 66 is a gear 79 generally similar to the gear 77, in that it is hollowed out in order that it may overlap the right hand side of the spool 66 and in that it is provided with compression springs which tend to retain the right hand side of the spool 66 out of frictional engagement with the said gear 79.

Keyed upon the shaft 60 and meshing with the gear 71 is a gear 81, having substantially the same number of teeth as the gear 71. Also keyed upon the shaft 60 is a gear 82 meshing with the gear 77 which is rotatably mounted on the shaft 53, the ratio of the gear 77 to the gear 82 being substantially two to one.

Keyed upon the shaft 60 and disposed opposite the gear 79, but not meshing therewith, is a small gear 83. Interposed between the gear 83 and the gear 79, is an idler gear 84 mounted upon a shaft 85, only a portion of which I have thought it necessary to illustrate.

Electric energy is supplied to the electromagnet windings upon the spools 62 and 66 through a common wire and four individual wires as shown, all of said wires leading through the hollow shaft 53 to a commutator 86 fixed upon the shaft 53 and disposed within a commutator housing 87 supported by the gear case 46. Inasmuch as the gear case is designed to contain a considerable quantity of lubricating oil, a stuffing box prevents the escape of oil from the gear case into the commutator housing. The commutator housing 87 is provided with a plurality of terminal posts, one of which is illustrated at 88, each of said terminal posts 88 being electrically connected with a brush riding upon one of the rings of the commutator 86.

It is apparent that when the coacting members of the cone clutch are in operative relation, the gear 50 is driven at engine speed and that the shaft 60 and all of the gears thereon are driven from the gear 50 due to the fact that the gear 50 meshes with the gear 61 keyed upon the shaft 60. The loosely mounted gears 77 and 79 are also driven from the shaft 60 but no movement is imparted to the shaft 53. It is to be understood that the shaft 53 is connected with the driving wheels of the vehicle with which the transmission mechanism of my invention is associated. When the operator wishes to drive the shaft 53 and connected devices at maximum speed he causes a current of electricity to flow through the coil 63, thereby creating a magnetic field and drawing the spool 62 into frictional engagement with the flange 59 formed integral with the gear 50. After the spool 62 has been drawn into frictional engagement with the flange 59, the circuit including the winding 63, is broken, but the residual magnetism serves to retain the spool 62 in frictional engagement with the flange 59. As long as spool 62 remains in frictional engagement with the flange 59, the shaft 53 is driven at the same speed as the shaft 44. When the operator wishes to disconnect the spool 62 from the flange 59, he causes a comparatively small amount of electric energy to flow through the winding 63 to neutralize the residual magnetism which holds the spool 62 in driven relation with the flange 59.

When the spool 62 is in engagement with the flange 59 the vehicle with which my system is associated, is driven at "third speed."

Should the operator wish to drive the vehicle at medium or "second speed," he causes an electric current to flow through the electromagnet winding 64 of the spool 62 whereupon the spool 62 is drawn into frictional engagement with the flange 72 of the disk 71. After the circuit including the winding 64 has been opened, the residual magnetism of the parts retains the spool 62 in frictional engagement with flange 72 until a comparatively small amount of electric energy is caused to flow through the coil 64 in reverse direction to neutralize the residual magnetism. When the spool 62 is in engagement with the flange 72 of the gear 71, the shaft 53 is driven from the gear 50 of the shaft 44 through the gear 61, shaft 60, gear 81, gear 71 and spool 62.

When the operator wishes to drive his vehicle at "first speed," he closes an electric circuit through the winding 67 of the spool 66, thereby attracting the spool 66 into frictional engagement with the loosely mounted gear 77. The spool 66 is held in driven relation to the loosely mounted gear 77 until the residual magnetism of the parts has been neutralized by a small amount of electric energy caused to pass through the winding 67 and reverse direction. When the spool 66 is in driven relation with the loosely mounted gear 77 the shaft 53 is driven from the gear 50 of the shaft 44 through gear 61, shaft 60, gear 82, gear 77 and spool 66.

When the operator wishes to drive his vehicle in reverse direction, he causes a flow of electric energy through the winding 68 of the spool 66, whereupon the spool 66 moves into frictional engagement with the gear 79 and remains in driven relation thereto until current is caused to flow through the winding 68 in reverse direction to neutralize the magnetism remaining after the initial flow of current has ceased. When the spool 66 is in driven relation to the gear 79, the shaft 53 is driven in a direction opposite to its normal direction of rotation, the said shaft 53 being driven from the shaft 44 and its gear 50 through gear 61, shaft 60, gear 83, idler gear 84, loosely mounted gear 79 and spool 66.

In some cases it is desirable that the magnetic gears and spools which serve as clutch members, be provided with faces of non-magnetic material. I contemplate providing the gears and spools with faces of non-magnetic material, such for instance, as fiber, and I also contemplate case hardening the engaging faces of the gears and spools to secure the same result, or substantially the same result as would be secured by providing the engaging faces of the gears and spools with disks of non-magnetic material. As is well known, case hardened steel is practically non-magnetic.

In describing the operation of the transmission mechanism shown in Fig. 1 of the drawings I have assumed that it is possible to cause certain electric currents to flow to control the several clutch members which determine whether the vehicle driving wheels shall be driven from the engine and at what speed they shall be driven. I shall now proceed to describe the mechanism whereby I am enabled to control to a nicety, the transmission mechanism just described.

I shall first describe the switching or controlling mechanism and then refer to a diagrammatic view which clearly reveals the relation and coöperation of the controlling mechanism and the transmission mechanism.

In Figs. 2 to 8, both inclusive, I have illustrated a switching or controlling mechanism wherein there is provided a lever for controlling the circuit for the cone clutch electromagnets. There are also provided three selector keys for causing the transmission mechanism to operate for first, second and third speeds and a selector key to cause the transmission mechanism to operate to drive the vehicle backward when desired. Suitable interlocking mechanism is provided to prevent the operation of any two of the selector keys at any one time. The switching or controlling mechanism is inclosed within a housing comprising a back plate 100 of insulating material and plates 101 and 102, and a sheet metal plate 103' which serves as the top, bottom and front of the housing for the switching or controlling mechanism. Journaled in the end plates 101 and 102 is a shaft 103 upon which the clutch controlling lever and the several selector keys are mounted.

As is clearly shown in Fig. 5 of the drawings the cone clutch controlling lever, shown at 104, comprises an integral sleeve 105 loosely mounted upon the shaft 103. As is most clearly shown in Fig. 3, the lever 104 comprises a portion 106 projecting downwardly from the sleeve 105 and pivoted to the portion 106 is a pawl 107 comprising a portion 107$^a$ arranged to engage the rear edge of the bottom of the lever 104 when the lever is in the position shown in Fig. 3. A coil spring 107$^b$, bearing against the pawl below its pivotal point, tends to retain the portion 107$^a$ thereof in engagement with the lower end of the clutch lever. Disposed below the clutch controlling lever and normally out of engagement with each other, are the contact springs 108 and 109 and 108$^a$ and 109$^a$. Mounted upon the free ends of the contact springs 108 and 108$^a$, but insulated therefrom as shown, is a metal block 110 provided with a beveled rear edge. A spring 111 tends to retain the lever 104 in the position shown in Fig. 3. It is to be noted that the lever 104 may be moved in a slot 112 in the plate 103′ and that the lever 104 is provided with a detent spring 113 arranged to engage in a notch 114.

Supported by the end plates 101 and 102, disposed in front of the shaft 103 and slightly below the same, is a bar 115 of insulating material adapted to support a plurality of contact springs, one pair of which, shown at 116, are arranged to be operated by the cone clutch controlling lever 104.

The contact springs 116 are disposed slightly above a second pair of contact springs 117 which are also supported by the insulation 115 and operated by the cone clutch controlling lever 104. Carried by the cone clutch controlling lever 104 is a block of insulation 118 provided with two conductor buttons 119 and 120. These buttons are so located upon the block 118 that when the lever 104 is moved to that position most remote from normal, the button 119 electrically connects the contacts 116 and the button 120 electrically connects the contacts 117. From the description just given it will be seen that when the lever 104 is operated, the pawl 107 carried at the lower end of said lever slips over the block 110 and permits the buttons 119 and 120 to electrically connect the contacts of the pairs 116 and 117. When, however, the switch lever 104 is returned to normal position, the pawl 107 riding upon the block 110 moves the contact 108 and 108$^a$ into electrical engagement with their associated contacts 109 and 109$^a$. If after the lever 104 has been operated to bring the buttons 119 and 120 between the contacts 116 and 117, and as pointed out the detent spring 113 be permitted to retain the lever 104 opposite the notch 114, the contact springs 108 and 108$^a$ will not be moved into engagement with their coöperating contact springs.

When, however, the lever 104 is released and permitted to move to normal position, the pawl 107 riding upon the block 110 moves the contacts 108 and 108$^a$ into electrical engagement with their contacts 109 and 109$^a$. While the purpose of this arrangement will be made more apparent when the circuits are considered, it might be well to point out at this time that when the buttons 119 and 120 establish electrical connection between the contacts 116 and 117 respectively, an electric circuit is established whereby current flows through the electromagnet windings of the cone clutch to move the shiftable clutch member into frictional engagement with its coacting clutch member. When the contacts 108 and 108$^a$ engage contacts 109 and 109$^a$, respectively, current flows through the electromagnet windings of the cone clutch to neutralize the residual magnetism which retains the members of the cone clutch in engagement after the circuit including the contact springs 116 and 117 has been opened.

Also mounted upon the shaft 103 are the selector keys 121, 122, 123 and 124. The selector key 121 is the "reverse" key and the keys 122, 123 and 124 are the first, second and third speed keys respectively. Each of the selector keys 121 to 124 respectively, comprises an integral sleeve disposed around the shaft 103. Each of the sleeves referred to is cut away at 125 and into each recess thus formed projects a pin 126 carried by the shaft 103, whereby the shaft 103 may move in a clock-wise direction (Fig. 3) independently of the selector keys but no one of the selector keys may be moved in the same direction independently of the shaft 103. Each of the selector keys 121 to 124, inclusive, is provided with a block of insulation 126′ provided with buttons similar to the buttons 119 and 120 carried by the block 118 of the cone clutch controlling lever 104. Disposed in front of each of the selector keys and carried by the bar 115, are two pairs of contact springs similar to the contact springs 116 and 117 associated with the cone clutch controlling lever. A coil spring 127 most clearly shown in Figs. 4 and 5, normally tends to hold the shaft 103 and consequently the selector keys 121 to 124 inclusive in the positions shown in the drawings.

Each of the selector keys 121 to 124 inclusive, is provided with a rearwardly extending sector 128, having a cam portion 129. It is to be noted that each of the sectors 128 is notched at 130. Extending through apertures in the end plates 101 and 102 is a locking bar 131 which is movable in a vertical plane and also shiftable in a line parallel to the axis of the cone clutch controlling lever 104 and the selector keys 121 to 124 inclusive. Formed in the lower edge of the locking bar 131, is a plurality of notches 132, one of which is disposed directly opposite the sector 128 of each of the selector keys 121 to 124. It will be seen that when any one of the selector keys 121 to 124 is actuated, its cam portion 129 will so shift the locking bar 131 that the notches 132 normally disposed opposite the other selector keys will be brought out of register with the sectors 128 of said other selector keys, thus preventing the operation of said other selector keys. A notch 133 formed in the sector 128 of each of the selector keys 121 to 124, is arranged to be engaged by a detent spring 134 (Fig. 3) when the selector key is in normal position.

Journaled in the end plates 101 and 102 is a shaft 135 having rigidly secured thereto arms 136 and 137 which extend through elongated slots in the locking bar 131. Secured to the arm 136 is resetting key 138. Interposed between the resetting key and the plate 103' is a spring 139 which tends to rotate the shaft 135 in a contra-clock-wise direction (Fig. 3). This being the case the locking bar 131 would be held in its uppermost position if some means were not provided for normally locking it in its lowermost position. Rigidly mounted on the shaft 103, at substantially its middle point, is an arm 140 provided with a finger arranged to engage in an opening 141 in the locking bar when the parts are in the positions shown in the drawings. The arm 140 is provided with a portion 142 extending below the shaft 103 and to this portion 142 is pivoted a block 143 arranged to effect the engagement of a plurality of pairs of contacts 144, 145, 146, 147 and 148. Attention is directed to the fact that the movable contacts of the pairs just mentioned are all mounted on a block of insulation 149, and that the movable contacts 144 to 147 inclusive, are electrically connected with each other. The block 143 engages the contacts of the bars just mentioned when the arm 140 moves in a clock-wise direction (Fig. 7) and holds said contacts in engagement until the rear edge of the block 143 slips off of the shoulder 150 formed on the block of insulation 149. When the arm 140 is returned to normal the contact pairs 144 to 148 are not effected.

It will be seen, therefore, that when any one of the selector keys 121 to 124 inclusive, is operated, the universal bar will be released and will move upwardly, under the action of the spring 139. As the selector key and consequently the shaft 103 continue to move, the contact pairs 144 to 148 will be operated and the locking bar 131 will be shifted lengthwise to prevent the actuation of the other selector keys 121 to 124 inclusive. After the contacts of the pairs 144 to 148 inclusive, have been operated, the two pairs of spring contacts carried by the bar 115 and associated with the actuated selector key are operated. It might be well to state at this point that when the contact pairs 144 to 148 are operated, electric current is caused to flow through all of the electromagnet windings within the transmission gear case to insure that any residual magnetism present in the gears with which said windings are associated, is neutralized. When the two pairs of contacts supported by the bar 115 are operated by an actuated selector key, energizing current is caused to flow through the corresponding electromagnet winding within the transmission gear keys.

After any one of the selector keys 121 to 124 has been operated, the spring 127 tends to return it to zero, but this is prevented by the arm 140 which comes into engagement with the lower portion of the locking bar 131. The operated selector key is prevented from being restored to normal position and all of the other selector keys are held against operation by the locking bar 131 until the reset button 138 is depressed, whereupon the finger of the arm 140 is permitted to slip in the opening 141 in the locking bar, thus restoring all of the parts to the positions shown in the drawings.

The switching and controlling mechanism just described is designed to be hinged to the seat of an automobile as is clearly shown in Fig. 8, and to be swung into a suitable recess when not in use. The mechanism is readily accessible, but may be swung out of the way when not in use.

Figure 9:
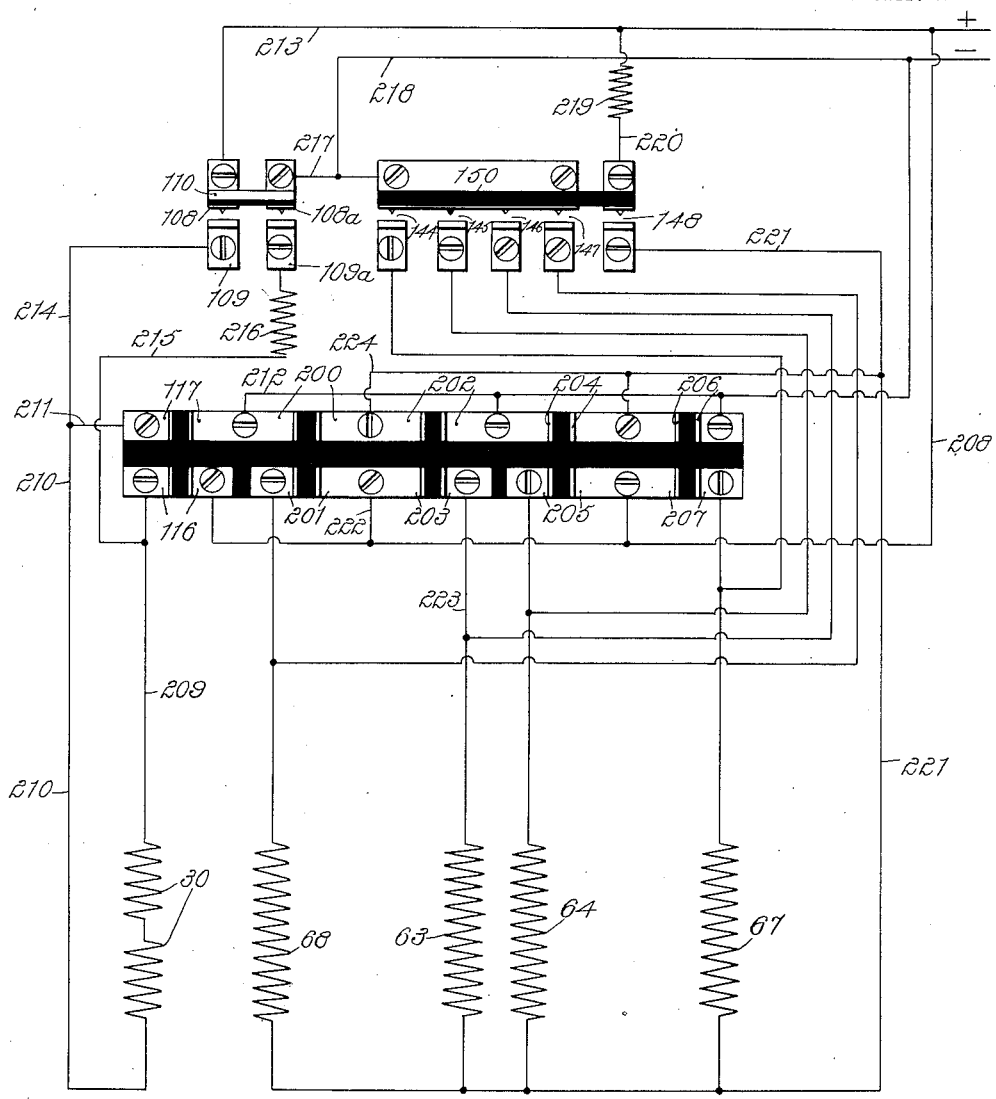
Fig. 9 illustrates the circuit connections employed when the mechanism illustrated in Fig. 1 is utilized in connection with the switching or controlling mechanism illustrated in Figs. 2 to 8, both inclusive.

In Fig. 9 of the drawings I have diagrammatically illustrated how the contacts of the switching and controlling mechanism are connected with the energizing windings of the transmission mechanism. It is to be remembered that when the cone clutch is to be put in operative condition, the windings 30 are energized; when the driving wheels are to be driven at first speed, the winding 63 is energized; when the driving wheels are to be driven at second speed the winding 64 is energized; when the driving wheels are to be driven at third speed the winding 67 is energized; and when the driving wheels are to be driven in reverse direction the winding 68 is energized. The several contacts of the switching or controlling mechanism are designated by the reference characters utilized in Figs. 2 to 8 inclusive. Inasmuch as reference characters were not utilized to designate the several contact pairs operated by the selector keys, that is, the contacts mounted on the block of insulation 115 (Figs. 3 and 4), I have designated the contact pairs mounted on the bar of insulation 115 as follows: Reference characters 200 and 201 indicate the contact pairs operated by the reverse selector key; 202 and 203 indicate the contact pairs operated by the first speed selector key; 204 and 205 indicate the contact pairs operated by the second speed selector key; 206 and 207 indicate the contact pairs operated by the third speed selector key.

The operation of the system diagrammatically illustrated in Fig. 9 is as follows: Whenever the operator wishes to energize the electromagnets 30 of the cone clutch to put the cone clutch in operative condition, he operates the cone clutch controlling lever 104, thereby operating the contact pairs 116 and 117 whereupon current flows from the source of current through conductor 208, the contacts of the pair 116, the conductor 209, the electromagnet windings 30, conductor 210, conductor 211, the contacts of the pair 117 and thence through conductor 212 back to the source of current. After the clutch controlling lever 104 has been actuated to operate the contact pairs 116 and 117 the said clutch controlling lever is moved to its middle position, in which its detent spring 113 engages in its coacting notch 114 (Figs. 3 and 4). When the cone clutch controlling lever is moved to this position, the circuit including the electromagnet windings 30 of the cone clutch is opened but the cone clutch is retained in operative condition as before explained, due to the residual magnetism of the several parts. When the cone clutch is to be rendered inoperative, the cone clutch controlling lever 104 is restored to normal position, whereupon the spring contacts 108 and 108ª are caused to engage their coöperating contacts 109 and 109ª respectively. Current then flows from the source of current through conductor 213, contacts 108 and 109, conductor 214, conductor 210, the electromagnet windings 30 of the cone clutch, conductor 209, conductor 215, resistance 216, contact springs 109ª and 108ª, conductor 217, and conductor 218 back to the source of current. Attention is directed to the fact that when the circuit just mentioned is established current flows through the windings of the electromagnets 30 in a direction reverse to that in which current flowed to effect the engagement of the cone clutch members and inasmuch as the resistance 216 is included in circuit the amount of energy supplied to the windings 30 is very small, only large enough in fact, to neutralize the residual magnetism of the cone clutch elements, thereby permitting the spring provided for that purpose to separate the cone clutch elements.

Whenever any one of the selector keys 121 to 124 is operated, the contacts of the pairs 144 to 148 are operated, thus closing circuits through a suitable resistance and each of the electromagnet windings within the gear case to neutralize any residual magnetism that may be present. It is to be remembered that this operation of the contacts 144 to 148 is accomplished during the time one of the selector keys is being moved from normal position but before it reaches the end of its stroke. When the contacts 144 to 148 are operated as set forth, current flows through conductor 213, a suitable resistance 219, conductor 220, contacts of the pair 148, conductor 221 to each one of the electromagnet windings 63, 64, 67 and 68 and then from each of the electromagnet windings through suitable conductors to one of the contact pairs 144 to 147 inclusive, and thence through conductor 218 back to the source of current.

After one of the selector keys has been operated to effect the engagement of the contacts of the pairs 144 to 148 as set forth, it is moved to the limit of its stroke, whereupon the contacts 144 to 148 are disengaged and the selector key operates its associated pairs of contacts supported by the bar of insulation 115. Assuming the first speed selector key 122 to be the one actuated, the contact pairs 202 and 203 are operated, whereupon current flows through conductor 208, conductor 222, the contacts of the pair 203, conductor 223, the electromagnet winding 63, conductor 221, conductor 224, contacts of the pair 202 and thence through conductor 212 back to the source of current. The circuits established when the other selector keys are operated may be similarly traced and I do not believe that it will be necessary for me to trace the individual circuits. It need only be pointed out that when any one of the selector keys is actuated current is caused to flow through all of the electromagnet windings within the transmission gear case before energizing current is supplied to the selected electromagnet winding to set the gearing for any desired speed of transmission or to connect the driving wheels in reverse relation to the engine.

Coming now to consider the arrangement of switching or controlling mechanism illustrated in Figs. 10, 11 and 12, it will be seen that I have provided a housing comprising a sheet metal plate forming the top and front of the housing, said sheet metal plate, indicated at 300 having two slots formed therein, one of which shown at 301 is arranged to have a clutch controlling lever work therein, and the other shown at 302 is arranged to have work therein a lever for controlling the circuits for the several electromagnet windings within a transmission gear case of the type shown in Fig. 1.

The housing also comprises the end plates 303 and 304 in which is journaled a shaft 305 upon which the clutch controlling lever 306 and the lever 307 for controlling the circuits for the electromagnets within a suitable transmission gear case, are mounted. A spring 308 normally retains the clutch controlling lever 306 in the position shown in the drawing. A spring No. 309 normally tends to move the lever 307 in a contraclockwise direction (Fig. 12) but a small spring 310 counteracts to a certain extent, the action of spring 309 and so retains the lever 307 in vertical position. The upper end of the spring 310 is attached to the free end of an arm 311 projecting from the shaft 305 in a line substantially at right angles to the axis of the shaft. A lug 312 carried by the base of the housing prevents the spring 310 from moving the free end of the arm 311 below the plane of the axis of the shaft 305. A lug 313 carried by the shaft 305 normally abuts against a pin 314 carried by the lever 307. It will thus be seen that the lever 307 may be moved in a clock-wise direction (Fig. 12) independently of the shaft 305 but that the said lever 307 is incapable of moving in a contra-clock-wise direction independently of the shaft. Although the spring 310 normally retains the lever 307 in the position shown in Fig. 12, the said lever may be moved in a contra-clock-wise direction by exerting sufficient pressure therein to overcome the action of the spring 310.

The clutch controlling lever 306 is provided with detent spring 315 arranged to engage in a notch 316 in the sheet metal plate 300. The lever 307 is also provided with a detent spring 317 arranged to engage in the notches 318, 319, 320 and 321 if desired. The plate 300 may also be provided with notches in which the spring 317 engages when the lever 307 is in normal position.

Carried by the clutch controlling lever 306 is a pair of contact buttons 322 and 323 arranged to be brought into engagement with contact buttons 324, 325, 326 and 327 when the said clutch controlling lever is moved in a contra-clock-wise direction (Fig. 11). The buttons 322 and 323 are electrically connected with flexible conductors 328 and the buttons 324 to 327 both inclusive, are arranged to be connected with suitable conductors.

The lever 307 is provided with a pair of conductor buttons 329 and 330 arranged to be brought into electrical engagement with the buttons 331 to 346, inclusive, when the lever 307 is shifted. Conductor buttons 329 and 330 are electrically connected with flexible conductors 347 and the conductor buttons 331 to 346 both inclusive, are arranged to be connected with suitable conductors.

Referring now to Fig. 13, it will be seen that the levers 306 and 307 are shown in dotted lines. The several conductor buttons carried by the levers and the walls of the housing are shown in connection with diagrammatical representations of the circuits established when the levers are shifted to bring the contact buttons carried thereby into electrical engagement with the contact buttons carried by the housing. In Fig. 13, the electromagnet windings associated with the cone clutch of the type shown at Fig. 1, are illustrated at 30$^a$, the windings arranged to be energized when the driving wheels of a vehicle are to be driven at first, second and third speed, are shown respectively at 63$^a$, 64$^a$ and 67$^a$, and the electromagnet winding to be energized when the vehicle is to be driven in reverse direction is shown at 68$^a$.

Attention is called to the fact that the buttons 322 and 323 carried by the clutch controlling lever 306 are normally out of engagement with the coöperating buttons with which they are to be brought into engagement when the clutch is to be placed in operative condition; the clutch controlling lever 306 is operated to move the buttons 322 and 323 past the buttons 324 and 325 and into engagement with the buttons 326 and 327. When the buttons 322 and 323 come into engagement with the buttons 324 and 325, a slight amount of electric energy is supplied to the windings 30$^a$ of the cone clutch, but this energy is insufficient to move the coöperating clutch members into engagement with each other. However, when the buttons 322 and 323 engage the buttons 326 and 327, a current flows from a suitable source of electricity through conductor 349, conductor 350, conductor button 322, conductor button 326, conductor 351, the electromagnet windings 30$^a$ associated with the cone clutch, conductor 352, conductor buttons 327 and 323, and thence through conductors 353 and 354 back to the source of current. When the circuit just described is closed, the clutch members are attracted into engagement with each other. The lever 306 is then moved into such position that the springs 315 engage the notches 316 (Fig. 11). When this is done, the circuit just described is opened but the clutch members remain in operative relation due to the residual magnetism. When the clutch members are to be disconnected however, the lever 306 is restored to normal position. As the buttons 322 and 323 engage the buttons 324 and 325, a circuit is closed through conductors 349, 350, conductor buttons 322 and 324, a suitable resistance 355, conductor 352, the windings 30$^a$, conductor 351, conductor 356, the buttons 323 and 325, and thence through conductor 353 back to the source of current. When the last mentioned circuit is established, a comparatively small amount of energy is supplied to the windings 30$^a$, but this is sufficient to disconnect the clutch members inasmuch as the current flows in reverse direction to that in which it flows when the lever 306 is in position to close the circuit to effect the engagement of the clutch member.

Coming now to the devices for controlling the circuits for the windings 63$^a$, 64$^a$, 67$^a$ and 68$^a$, which windings are located in a suitable transmission gear case of the kind shown in Fig. 1, it will be seen that when the conductor buttons carried by the lever 307 are in engagement with the conductor buttons 331 and 332, an electrical circuit including a resistance will be closed through each of the windings 63ª, 64ª, 67ª and 68ª to insure that the clutching devices with which these coils are associated are in disconnected condition. When, however, the buttons carried by the lever 307 are brought into engagement with the buttons 333 and 334, an electrical circuit is closed through the winding 63ª to effect the connection of the clutching devices with which said coil is associated. After the clutching devices have been connected, the lever 307 is moved to such a position that the detent springs carried thereby engage in the notches 319. If the lever 307 be now restored to normal position when the conductor buttons 329 and 330 engage the buttons 331 and 332, current will be caused to flow through the winding 63ª in reversed direction, thereby neutralizing the residual magnetism of the clutching elements with which the coil 63ª is associated, and disconnecting them. It will be seen that the lever 307 may be moved into position to close a circuit through any one of the coils 63ª, 64ª, 67ª or 68ª desired, and that immediately prior to closing a circuit through any one of these coils to effect the engagement of the clutching devices with which the coil is associated, a small amount of energy flowing in reversed direction is supplied to all of the coils to insure that any residual magnetism present in the clutching devices with which they may be associated, is neutralized. I shall not go into a detailed description of this modification of my invention as I think it is apparent how the same operates.

Referring to Fig. 14, of the drawings it will be seen that I have shown at 400 a transmission gear case similar to the transmission gear case shown in Fig. 4 and at 401 I have shown a cone clutch and fly wheel of the type shown in Fig. 1. At 402 is illustrated a motor for starting the engine with which the transmission mechanism is associated, and at 403 is shown an arm which, when it is moved toward the magnet 404, is arranged to close the circuit for the starting motor. A spring 405 normally retains the starting motor circuit in open condition. The arm 403 has formed integral therewith, an arm 406 abutting against a plate 407 carried by and shiftable with the movable element of the cone clutch. It will be seen that when the cone clutch is in closed position, the plate 407 will be in the position indicated in dotted lines and consequently it will be impossible to close the circuit for the starting motor. When the cone clutch members are disengaged, the plate 407 assumes the position shown in full lines and it becomes possible to close the starting motor circuit. After the circuit has been closed, the magnet 404 holds the arm 403' in actuated position until the internal combustion engine running under its own power drives the starting motor to set up a contra-electro-motive force in the motor circuit, thus deënergizing the magnet 404 and opening the circuit.

While I have shown my invention in the particular embodiments herein shown and described, I do not limit myself to these particular constructions but desire to claim broadly any equivalents thereof which may suggest themselves to those skilled in the art.

What I claim as new and desire to secure by Letters Patent of the United States, is:

1. Mechanism of the class described comprising a plurality of pairs of coöperating clutch members, one clutch member of each pair comprising an energizing winding, a source of electric energy, mechanism for supplying a comparatively small amount of electric energy to all of said windings to insure the disengagement of the clutch members of the several pairs, mechanism for supplying a comparatively large amount of electric energy to the winding supported by a clutch member of any selected pair to effect the engagement of that pair of clutch members, and means for supplying a comparatively small amount of electric energy to the last mentioned winding to effect the disengagement of the clutch members of the last mentioned pair.

2. Mechanism of the class described comprising a plurality of pairs of coöperating clutch members, one clutch member of each pair comprising an energizing winding, a source of electric energy, circuit connections comprising a high resistance path, means for closing an electric circuit through all of said windings, and said high resistance path to insure the disengagement of the clutch members of each pair, means for causing electric current to flow through one of said windings in reverse direction to effect the engagement of the pair of clutch members with which said winding is associated, and means for again closing an electric circuit through said winding and the high resistance path to effect the disengagement of said clutch members.

3. Mechanism of the class described comprising a plurality of pairs of coöperating clutch members, one clutch member of each pair provided with an energizing winding, a source of electric energy common to all of said windings, means for causing electric current to flow through all of said windings to insure the separation of the clutch members of each pair, mechanism for causing a greater amount of electric energy to flow in opposite direction through the winding associated with any selected pair of clutch members to effect the engagement of the clutch members of that pair, and mechanism for selectively causing a comparatively small amount of electric energy to flow through said last mentioned winding in a direction opposite to the direction in which the comparatively large amount of energy flowed to cause the disengagement of the clutch members.

4. In combination, a plurality of pairs of electrically operated clutch members, an energizing winding associated with each pair of clutch members, a source of electric energy common to all of said windings, a plurality of selector keys controlling the circuits for said windings, and interlocking mechanism associated with said selector keys.

5. In combination, a plurality of pairs of coöperating clutch members, an energizing winding associated with each pair of clutch members, a source of electric energy common to all of said windings, a selector key for each of said windings, each of said selector keys when operated adapted to cause a comparatively small amount of electric energy to flow through all of said windings to insure the disengagement of the clutch members of the several pairs and then to cause a comparatively larger amount of electric energy to flow in reverse direction through the winding associated with one pair of clutch members to effect the engagement of that pair of clutch members.

6. In combination, a plurality of pairs of coöperating clutch members, an energizing winding associated with each pair of clutch members, a source of electric energy common to all of said windings, a selector key for each of said windings, each of said selector keys when operated adapted to cause a comparatively small amount of electric energy to flow through all of said windings to insure the disengagement of the clutch members of the several pairs and then to cause a comparatively larger amount of electric energy to flow in reverse direction through the winding associated with one pair of clutch members to effect the engagement of that pair of clutch members, and an interlocking mechanism associated with said selector keys.

7. In combination, a plurality of electric clutching mechanisms, each clutching mechanism comprising a plurality of magnetic clutch disks, one of the clutch disks of each clutching mechanism provided with an energizing winding, a plurality of selector keys, one for each energizing winding, said selector keys shiftable on a common axis, each of said selector keys comprising means arranged when the selector key is actuated, to first cause a comparatively small amount of electric energy to flow through all of the energizing windings and then causing a comparatively large amount of electric energy to flow in reverse direction through the selected winding.

8. In combination, a plurality of electric clutching mechanisms, each clutching mechanism comprising a set of magnetic clutch disks, an energizing winding, associated with one of the clutch disks of each set, a source of electric energy, a selector key for each energizing winding, each selector key comprising means adapted when the selector key is actuated, to first cause a comparatively small amount of electric energy to flow through all of the energizing windings, and then causing a greater amount of electric energy to flow through the selected winding, and means for preventing actuation of more than one of said selector keys at any one time.

9. In combination, a plurality of electric clutching mechanisms, each clutching mechanism comprising a plurality of magnetic clutch members, an energizing winding associated with one of the clutch members of each set, a source of electric energy, a plurality of selector keys, one for each winding, each of said selector keys adapted when operated, to cause electric current to be supplied to its corresponding winding, and means for preventing more than one of said selector keys being operated at any one time.

10. In combination, a plurality of electric clutching mechanisms, each clutching mechanism comprising a set of magnetic clutch disks, one clutch disk of each set provided with an energizing winding, a source of electric energy, a plurality of selector keys, one for each winding, each of said selector keys, when operated, arranged to cause electric energy to be supplied to its corresponding clutch winding, a locking bar, and means carried by each of said keys arranged when the key is operated, to actuate the locking bar to lock all of the other selector keys in normal position.

11. In combination, a pair of electrically operated clutching mechanisms, each of said clutching mechanisms comprising a set of magnetic clutch members, a selector key, a source of electric energy, and two sets of contacts controlled by each selector key, each of said clutching mechanisms comprising an energizing coil, said selector key when operated, first operating one set of said contacts to cause a comparatively small amount of electric energy to flow through both of the energizing windings to insure that both clutching mechanisms are demagnetized, and then operating the other set of contacts to cause a comparatively large amount of electric energy to flow through a selected winding to magnetize the clutch members associated therewith.

12. In combination, a plurality of electrically operated clutching mechanisms, an energizing winding associated with each clutching mechanism, a source of electric energy, a selector key for each clutching mechanism arranged when operated to furnish electric energy to its corresponding energizing winding, means normally tending to turn all of said selector keys to normal position, and means associated with each selector key for retaining it in actuating position when operated.

13. In combination, a plurality of electrically operated clutching mechanisms, each of said clutching mechanisms comprising an energizing winding, a source of electric energy, a plurality of operating keys, one for each energizing winding, each of said keys when actuated, arranged to cause electric energy to flow through its corresponding energizing winding, and devices for preventing more than one of said keys being actuated at any one time.

14. In combination, a plurality of electrically operated clutching mechanisms, each of said clutching mechanisms comprising an energizing winding, a source of electric energy, and a plurality of controlling devices, one for each energizing winding, each of said controlling devices when operated, adapted to cause electric energy to be supplied to its corresponding winding, and mechanism for preventing any two of said controlling devices from being actuated at any one time.

15. In combination, a plurality of electric clutching mechanisms, each of said clutching mechanisms comprising an energizing winding, a source of electric energy, a plurality of selector keys, one for each energizing winding, and a locking bar associated with said selector keys, said locking bar shiftable in one direction when any one of the selector keys is operated to prevent the other selector keys from being operated and shiftable in another direction to prevent an operated selector key from being returned to normal position.

16. In combination, a plurality of electric clutching mechanisms, each of said clutching mechanisms comprising an energizing winding, a source of electric energy, a plurality of selector keys, one for each of said windings, a locking bar associated with said selector keys, a plurality of slots in the locking bar, each of said selector keys comprising a cam portion projecting into one of said slots, the cam portion carried by each of the selector keys arranged when the selector key is operated, to shift the locking bar to lock all of the other selector keys in nonactuated position.

17. In combination, a plurality of electric clutching mechanisms, each of said clutching mechanisms comprising an energizing winding, a plurality of selector keys, one for each energizing winding, a locking device, a reset button associated with said locking device, and means whereby said locking device is shifted when any one of said selector keys is operated to prevent said selector key from being returned to normal position until the reset button is operated.

18. In combination, a plurality of electric clutching mechanisms, an energizing winding associated with each clutching mechanism, a source of electric energy, a selector key for each of said energizing windings, a locking bar, and means arranged to shift the locking bar when one of said selector keys is operated to prevent said key from being returned to normal position until the locking bar is manually restored to normal position.

19. In combination, a driving shaft, a driven shaft, a plurality of magnetic clutching mechanisms, each of said clutching mechanisms adapted when actuated, to connect the driven shaft with the driving shaft in a predetermined ratio, means for selectively actuating said clutching mechanisms, and means for insuring that all of said clutching mechanisms are in nonoperative condition before any one of said clutching mechanisms is actuated.

In witness whereof, I hereunto subscribe my name this 5th day of February, A. D. 1914.

GEORGE M. WILLIS.

Witnesses:
LESLIE W. FRICKE,
A. G. McCALEB.

It is hereby certified that in Letters Patent No. 1,268,777, granted June 4, 1918, upon the application of George M. Willis, of Chicago, Illinois, for an improvement in "Transmission Mechanism," errors appear in the printed specification requiring correction as follows: Page 4, line 26, after the word "third" insert the words *or high;* same page, line 46, after the word "first" insert the words *or low;* page 5, line 56, for the word "contact" read *contacts;* same page, line 92, and page 8, line 69, for the word "first" read *third;* same pages, lines 93 and 70, for the word "third" read *first;* page 6, line 110, for the word "first" read *third or high;* same page, line 114, and page 7, line 4, for the word "third" read *first or low;* same pages, lines 130 and 85, for the word "first" read *third or high;* and that the said Letters Patent should be read with these corrections therein that the same may conform to the record of the case in the Patent Office.

Signed and sealed this 6th day of August, A. D., 1918.

[SEAL.]

R. F. WHITEHEAD,
*Acting Commissioner of Patents.*

Cl. 172—239.